(12) United States Patent
Kim

(10) Patent No.: US 7,885,431 B2
(45) Date of Patent: Feb. 8, 2011

(54) CONTROLLING OPERATION OF INFORMATION PROCESSING DEVICE USING MOVEMENT DATA

(75) Inventor: Jung Hun Kim, Soowon-si (KR)

(73) Assignee: LG Electronics Inc., Seoul (KR)

( * ) Notice: Subject to any disclaimer, the term of this patent is extended or adjusted under 35 U.S.C. 154(b) by 1035 days.

(21) Appl. No.: 11/673,000

(22) Filed: Feb. 9, 2007

(65) Prior Publication Data

US 2007/0288779 A1    Dec. 13, 2007

(30) Foreign Application Priority Data

May 16, 2006    (KR) ...................... 10-2006-0043707

(51) Int. Cl.
  *G06K 9/00*    (2006.01)
  *G09G 5/00*    (2006.01)
(52) U.S. Cl. ...................... 382/107; 345/156
(58) Field of Classification Search ................ 382/107; 345/156, 690
  See application file for complete search history.

(56) References Cited

U.S. PATENT DOCUMENTS

| 6,445,383 | B1 | 9/2002 | Chambers |
| 6,710,346 | B2 * | 3/2004 | Brewington et al. ...... 250/341.8 |
| 2004/0001076 | A1 * | 1/2004 | Leng et al. ................. 345/690 |
| 2004/0196262 | A1 | 10/2004 | Poltorak |
| 2005/0270700 | A1 | 12/2005 | Matsumoto |
| 2006/0097983 | A1 * | 5/2006 | Haggman et al. ........... 345/156 |
| 2006/0132434 | A1 * | 6/2006 | Kern .......................... 345/156 |

FOREIGN PATENT DOCUMENTS

| CN | 1287634 | 3/2001 |
| CN | 1315692 A | 10/2001 |
| CN | 1601443 | 3/2005 |
| CN | 1198239 | 4/2005 |

OTHER PUBLICATIONS

Chinese Office Action dated May 30, 2008, on Chinese Application No. 200710087759.8 (13 pages).
China Office Action dated Dec. 4, 2009 for Application No. 200710087759.8, (with English translation), 40 pages.

* cited by examiner

*Primary Examiner*—Bhavesh M Mehta
*Assistant Examiner*—Hadi Akhavannik
(74) *Attorney, Agent, or Firm*—Fish & Richardson P.C.

(57) ABSTRACT

An apparatus and a method for controlling an operation of an information processing device using movement data of the information processing device or a peripheral device are provided. An operation configuration variable set value for performing a predetermined function of the information processing device is changed according to movement data of the information processing device or the peripheral device detected by a movement detecting unit. After that, a predetermined function provided by the information processing device is automatically enabled or disabled, so that power consumption of a battery is minimized and user convenience in using the information processing device is enhanced.

41 Claims, 5 Drawing Sheets

CONTROLLING OPERATION OF INFORMATION PROCESSING DEVICE USING MOVEMENT DATA

CROSS-REFERENCE TO RELATED APPLICATIONS

This is application claims priority to Korean Patent Application No. 10-2006-0043707filed May 16, 2006, and titled "CONTROLLING OPERATION OF INFORMATION PROCESSING DEVICE USING MOVEMENT DATA". The entire contents of the prior application are incorporated herein in their entirety.

BACKGROUND

1. Technical Field

This disclosure relates to controlling an operation of an information processing device using movement data.

2. Description of the Related Art

A personal computer (PC), including a notebook computer, operates with a configuration where functions provided by the computer are set in advance for a user regardless of whether the user uses the functions.

Once booted, the computer operates under a set state depending on an operating environment set in advance even when a predetermined function is not in practical use due to a user's personal situation. Accordingly, unnecessary power is consumed.

In the case where a notebook computer using a battery power source is carried by a user, the user may sometimes leave the notebook computer turned on, even when the user does not practically use the notebook computer. In this case, the battery having a limited capacity is unnecessarily consumed, and the available time to use the notebook computer is reduced by the shortage of the battery capacity.

Movement may be detected by using a G-sensor. A G-sensor has been recently used for protecting a hard disc drive (HDD) in a notebook computer product. The G-sensor, which is a three axis-acceleration detecting sensor, is a movement detection sensor for detecting movement such as a position change of a system, a fall down, or instant horizontal or vertical movement, by detecting moving acceleration in three axes of x, y, and z in a space. The G-sensor applied to a notebook computer protects an HDD from an external impact by stopping the operation of the HDD, for example, when a position change, such as a fall down or instant horizontal or vertical movement, occurs.

SUMMARY

In one general aspect, an information processing device includes a movement detecting unit and a control unit. The movement detecting unit is configured to provide a movement signal indicating a movement of the information processing device. The control unit is configured to control operation of the information processing device based on the movement signal of the movement detecting unit.

The control unit may be further configured to control power consumption of the information processing device based on the movement signal. The information processing device may further include a display unit and the brightness of the display unit may be adjusted based on the movement signal. The information processing device may further include a touch screen unit which is configured to be disabled or enabled based on the movement signal.

If the information processing device includes a storage unit, such as HDD, which includes a G-sensor for protecting the HDD from an external impact, the G-sensor may also operate as the movement detecting unit.

In another general aspect, controlling an operation of an information processing device includes detecting movement data of the information processing device, and controlling an operation environment for performing the predetermined function on the basis of the detected movement data.

In another general aspect, an apparatus and a method for controlling an operation of an information processing device, such as a notebook computer, using movement data, include detecting movement data of an information processing device and automatically controlling brightness of a screen of a display unit of the information processing device on the basis of the detected movement data to minimize power consumption of a battery.

In another general aspect, an apparatus and a method for controlling an operation of an information processing device using movement data includes automatically controlling a touch screen function using enable/disable states by using the movement data of the information processing device.

Additional features will be apparent from the description which follows, including the drawings, and the claims.

In another general aspect, an apparatus for controlling an operation of an information processing device using movement data includes a set data storing unit for storing an operation configuration set value for performing a predetermined function of the information processing device, a function processing unit for performing the predetermined function using the operation configuration set value, a movement detecting unit for detecting movement data of one of the information processing device and a peripheral device thereof, and a control unit for controlling an operation of performing the predetermined function by the function processing unit depending on an output of the movement detecting unit.

In another general aspect, an apparatus for controlling an operation of an information processing device using movement data includes a brightness adjusting unit for outputting a screen brightness adjustment signal of a display unit, a movement detecting unit for detecting movement data of the information processing device, and a control unit for outputting a brightness level data corresponding to an output of the movement detecting unit to the brightness adjusting unit.

In another general aspect, an apparatus for controlling an operation of an information processing device using movement data includes a touch screen driving unit for realizing a touch screen function on a display unit of the information processing device, a movement detecting unit for detecting and outputting a movement data of one of the information processing device and a peripheral device, and a control unit for enabling or disabling an operation of the touch screen driving unit depending on an output of the movement detecting unit.

In another general aspect, an improved method for controlling an operation of an information processing device using movement data includes detecting movement data of one of the information processing device and a peripheral device associated with performance of a predetermined function, and controlling an operation of executing the predetermined function using the detected movement data.

Implementations of the apparatus and method for controlling an operation of an information processing device using movement data may automatically control the performance of a predetermined function depending on a degree of movement of the information processing device, so that screen brightness of a display unit is reduced under a condition that a probability where a user does not use the information processing device is high. Accordingly, power consumed for driving the display unit of the information processing device is minimized, so that not only an available time of a battery increases but also convenience in using the information processing device is enhanced.

It is to be understood that both the foregoing general description and the following detailed description are exemplary and explanatory and are intended to provide further explanation of the subject matter claimed.

DETAILED DESCRIPTION

Power consumption of a battery of a portable information processing device may be reduced by allowing performing of a predetermined function of the information processing device to be automatically controlled using an output of a movement sensor provided for protecting the information processing device. In addition, user convenience in using the information processing device may be enhanced by allowing a function needed by a user to be automatically performed.

Figure 1:
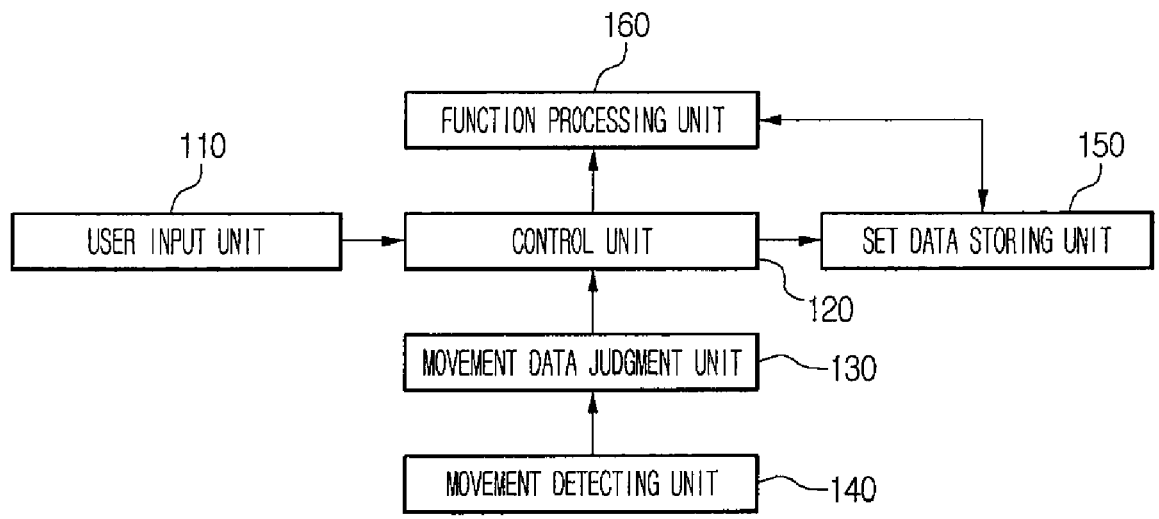
FIG. 1 is a block diagram of an apparatus for controlling an operation of an information processing device using movement data.

FIG. 1 is a block diagram of an example apparatus for controlling an operation of an information processing device using movement data. Referring to FIG. 1, the apparatus for controlling the operation of an information processing device using movement data includes a user input unit 110, a set data storing unit 150, a function processing unit 160, a movement detecting unit 140, and a control unit 120.

The user input unit 110 is configured to permit a user to input a control command for directly operating the information processing device, or to input a user selection signal for setting operation configuration variables of the information processing device to operate the information processing device under a predetermined condition. Generally, the user input unit 110 may include buttons provided on a predetermined portion of the information processing device, a keyboard or a mouse connected to input/output ports of the information processing device, a remote controller, a wireless keyboard, and a wireless mouse for inputting a user's command wirelessly.

The set data storing unit 150 can include a memory such as a random access memory (RAM) and a read only memory (ROM), and a predetermined memory region of a hard disk drive (HDD). The set data storing unit 150 stores data regarding operation configuration set values for operating the information processing device in response to user input data provided through the user input unit 110. The operation configuration set values include a set value for enabling/disabling performing of a predetermined function.

The function processing unit 160 performs a predetermined function according to the operation configuration set values stored in the set data storing unit 150. The predetermined function may include functions provided for necessary operations of the information processing device, such as an adjustment of screen brightness of a display unit, an adjustment of an output level of a voice signal, an HDD protection function, an on-screen display function, and a touch screen function.

The movement detecting unit 140 may include a movement detecting sensor such as a G-sensor provided to an information processing device or a peripheral device of the information processing device. The movement detecting unit 140 detects movement data of the information processing device or the peripheral device of the information processing device using the movement detecting sensor, and converts the detected movement data into an appropriate signal form to output the converted signal to the control unit 120.

The movement data can be proportional to a movement degree or acceleration of the information processing device or the peripheral device thereof detected by the movement detecting sensor.

The control unit 120 sets operation configuration variables of the information processing device and controls the set operation configuration variables to be stored in the set data storing unit 150 to allow the information processing device to operate in response to a user command provided through the user input unit 110. Also, the control unit 120 directly controls an operation of the function processing unit 160 or controls an operation of the information processing device by modifying the operation configuration variables stored in the set data storing unit 150 depending on movement data of the information processing device or the peripheral device thereof that are output from the movement detecting unit 140.

The control unit 120 can be a general microcomputer that analyzes movement data of the information processing device or the peripheral device thereof that is output from the movement detecting unit 140 and executes a program to make a corresponding control. The control unit 120 can include, as a separate module, a movement data judgment unit 130 for analyzing movement data of the information processing device or the peripheral device thereof that is output from the movement detecting unit 140, judging whether it is necessary for the information processing device to modify operation configuration variables required for performing a predetermined function, and outputting the judgment results.

An example implementation of the above apparatus in a notebook computer is described below.

Figure 2:
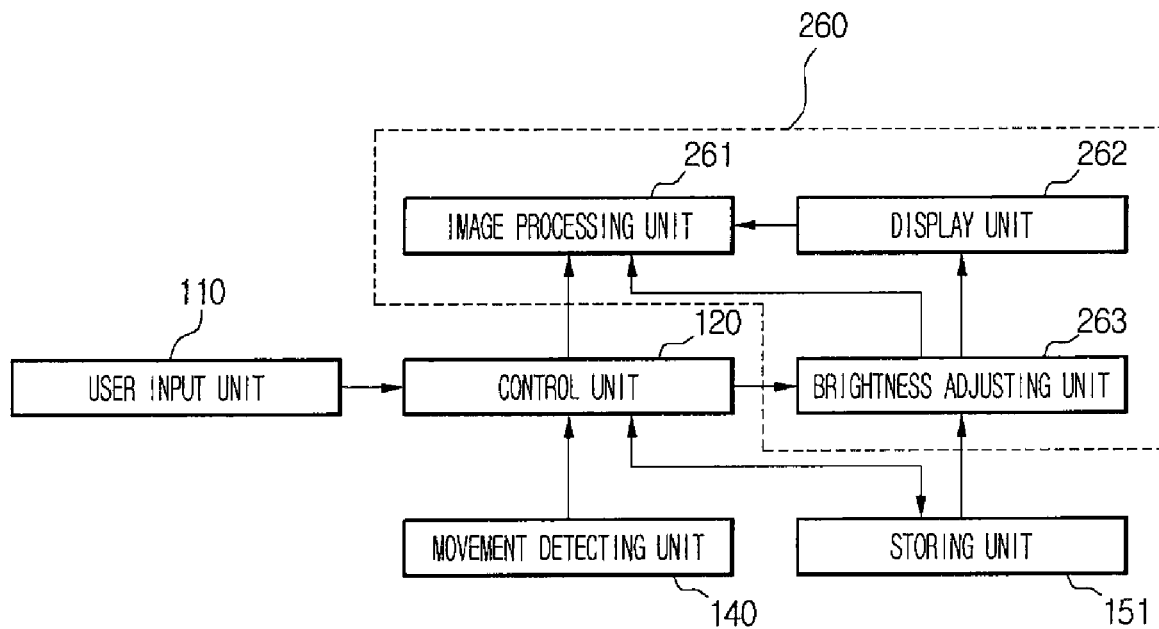
FIG. 2 is a block diagram of another apparatus for controlling an operation of an information processing device using movement data.
Figure 3:
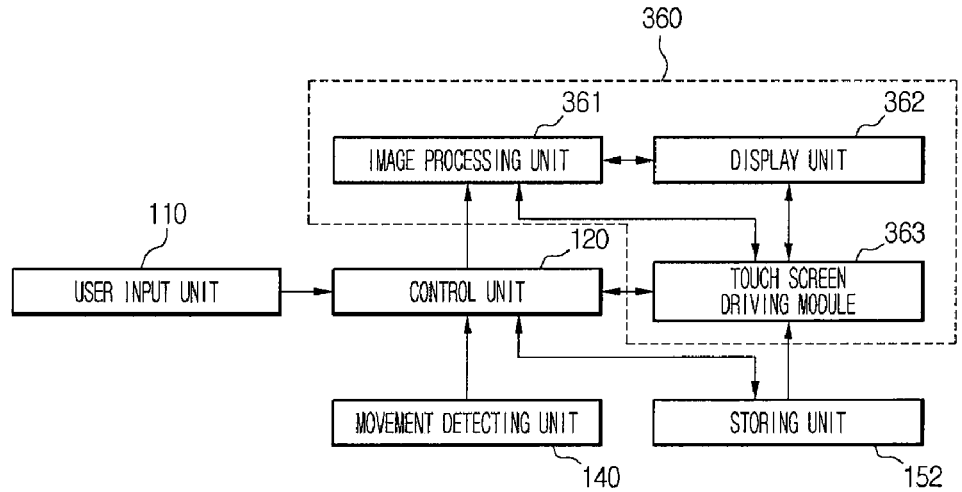
FIG. 3 is a block diagram of another apparatus for controlling an operation of an information processing device using movement data.

FIG. 2 is a block diagram of an apparatus for controlling an operation of an information processing device using movement data. FIG. 3 is a block diagram of another apparatus for controlling an operation of an information processing device using movement data.

In one implementation, a brightness adjusting unit for a display unit in a notebook computer using movement data includes a user input unit 110 for inputting a user command to the notebook computer, an image driving unit 260, a storing unit 151, a movement detecting unit 140, and a control unit 120 as illustrated in FIG. 2.

The user input unit 110 is designed for inputting, by a user, a control command for performing a predetermined function of the notebook computer or inputting a user command for setting operation configuration variables of the notebook computer to operate the notebook computer under a predetermined condition. Generally, the user input unit 110 may include a plurality of buttons provided on a predetermined portion of a main machine of the notebook computer, a keyboard or a mouse connected to an input/output ports of the notebook computer, a remote controller, a wireless keyboard, and a wireless mouse for inputting a user's command wirelessly.

The image driving unit 260 includes an image signal processing unit 261 for processing image-related signals such that the signals are appropriate for being displayed on a display unit, the display unit 262 including an LCD display panel for displaying image signals output from the image signal processing unit 261, and a brightness adjusting unit 263 for controlling screen brightness displayed on the display unit 262.

The storing unit 151 includes a memory such as a RAM and a ROM, or a predetermined memory region of an HDD to store a program required for driving a notebook computer, an application program, user data, and data related to operation configuration set values for operation of various elements of the notebook computer including the display unit.

The movement detecting unit 140 includes a movement detecting sensor, such as a G-sensor, provided to a predetermined portion of the notebook computer.

In the case where position change of the system, such as a fall down or instant horizontal or vertical movement occurs, the movement detecting unit 140 detects a signal that is proportional to movement of the notebook computer, converts the detected movement signal into an appropriate signal, and outputs the converted signal to the control unit 120.

The control unit 120 sets operation configuration variables of the notebook computer and controls the set operation configuration variables to be stored in the storing unit 150 to allow the notebook computer to operate in response to a user command inputted through the user input unit 110. Also, the control unit 120 directly controls the brightness adjusting unit 263 of the image driving unit or controls brightness of the display unit of the notebook computer by modifying the operation configuration variables stored in the storing unit 150 depending on movement data of the information processing device or the peripheral device thereof that are output from the movement detecting unit 140.

In such an implementation, the movement detecting unit 140 detects a signal that is proportional to movement of the notebook computer, converts the signal into a movement data signal, and outputs the converted movement data signal to the control unit 120. The control unit 120 judges a possibility that the notebook computer is currently being used based on the movement data. The control unit 120 minimizes screen brightness of the display unit 262 and thus minimizes power consumption of the notebook computer, in the case where the possibility that the notebook computer is currently being used is low, by controlling brightness of a screen displayed on the display unit 262 of the notebook computer to a predetermined level on the basis of the current use possibility according to the judgment results.

In another implementation, as illustrated in FIG. 3, a touch screen function control unit in a notebook computer using movement data may include a user input unit 110 for inputting a user command to the notebook computer, a touch screen driving unit 360, a storing unit 152, a movement detecting unit 140, and a control unit 120.

The user input unit 110, the storing unit 151, and the movement detecting unit 140 operate in a similar manner as described in connection with FIG. 2.

The touch screen driving unit 360 includes an image signal processing unit 361 for processing image-related signals such that the signals are appropriate for being displayed on a display unit 362 that includes an LCD display panel for displaying image signals from the image signal processing unit 361, and a touch screen driving module 363 for displaying a user interface screen on the display unit 362 and processing user input signals from the display unit 362 to output the processed signals to the control unit 120.

The movement detecting unit 140 detects a signal that is proportional to movement of the notebook computer, converts the signal into a movement data signal, and outputs the converted movement data signal to the control unit 120. The control unit 120 judges a possibility that the notebook computer is currently being used based on the movement data. The control unit 120 minimizes power consumption of the notebook computer, in the case where the possibility that the notebook computer is currently being used is low, by enabling/disabling the touch screen driving module 363 of the notebook computer on the basis of a current use possibility according to the judgment results.

An exemplary method for controlling an operation of an information processing device using movement data is described below.

Figure 4:
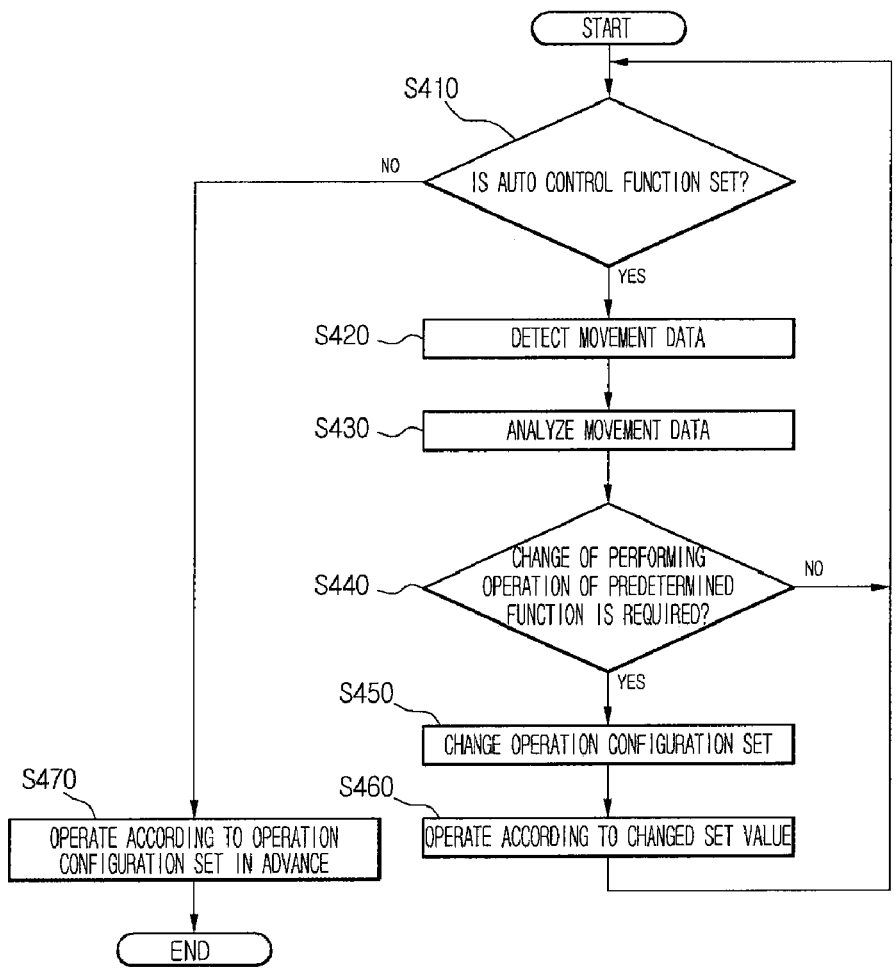
FIG. 4 is a flowchart of a method for controlling an operation of an information processing device using movement data.

FIG. 4 is a flowchart of a method for controlling an operation of an information processing device using movement data.

Referring to FIG. 4, the control unit 120 judges whether an operation control function of the information processing device is set to be automatically performed in order to control an operation of the information processing device (S410).

When the operation control function of the information processing device is not set to be automatically performed as a result of the judgment (S410), the control unit operates the information processing device according to a conventional operation configuration set in advance (S470).

When the operation control function of the information processing device is set to be automatically performed as a result of the judgment (S410), the control unit 120 receives movement data detected by the movement detecting unit 140 (S420).

In the case where a movement data judgment module 130 is provided as a separate module to or inside the control unit 120, the movement data judgment module 130 analyzes the movement data output from the movement detecting unit 140 (S430) to judge whether the movement data matches certain movement data that is associated with performing a predetermined function of the information processing device (S440).

When the movement data matches certain movement data associated with performing the predetermined function of the information processing device and the change of a performing operation of the predetermined function is required as a result of the judgment (S440), the control unit 160 directly controls the function processing unit 160 in order to directly change the performing operation of the predetermined function, or changes and stores operation configuration set values stored in the storing unit 150 in order to perform the predetermined function so that the information processing device operates in response to the movement data (S450). The information processing device then operates under the changed operation configuration in response to the movement data (S460)).

Example implementations of the method for a screen brightness adjustment and a touch screen function performance control are described below.

Figure 5:
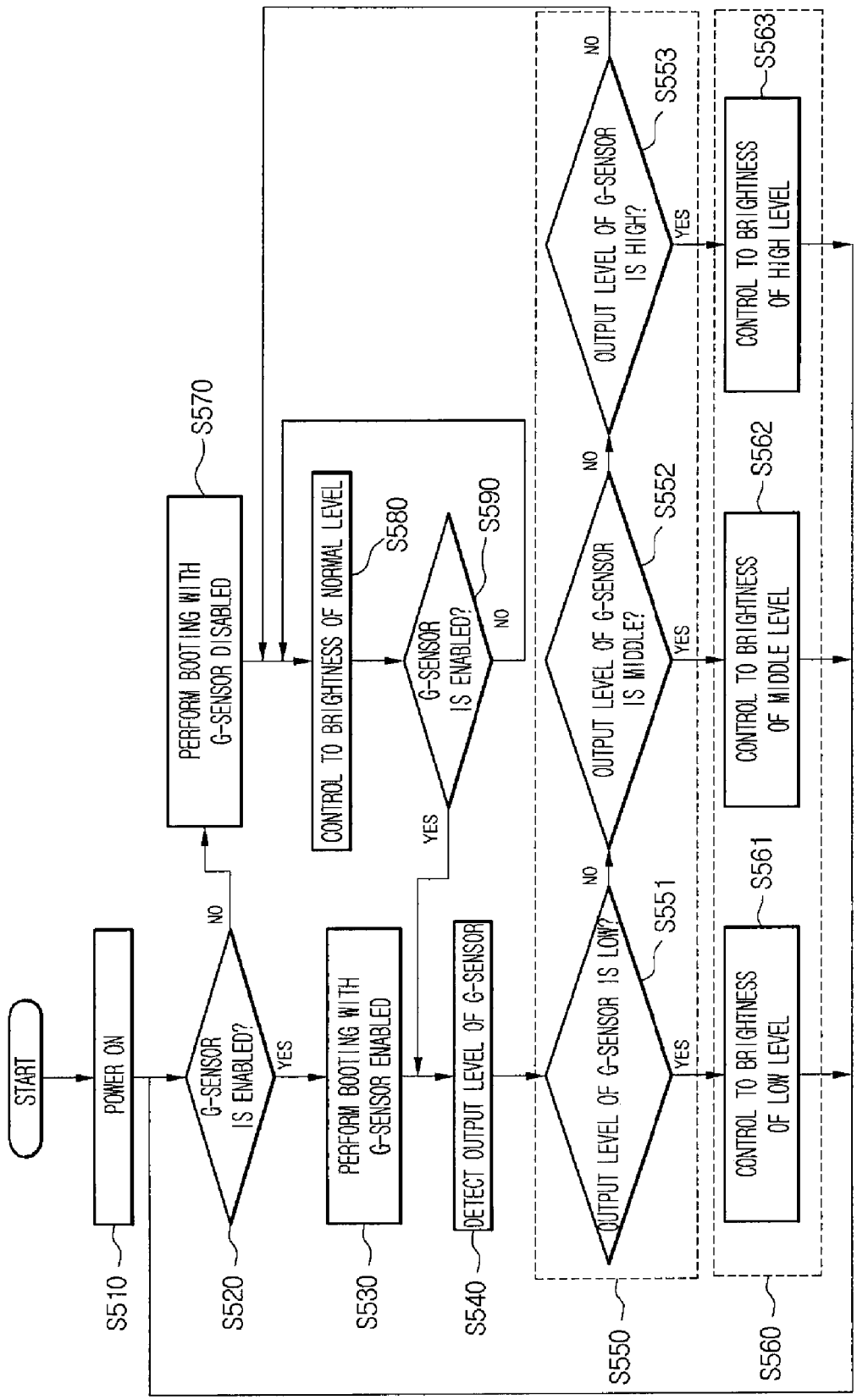
FIG. 5 is a flowchart of another method for controlling an operation of an information processing device using movement data.
Figure 6:
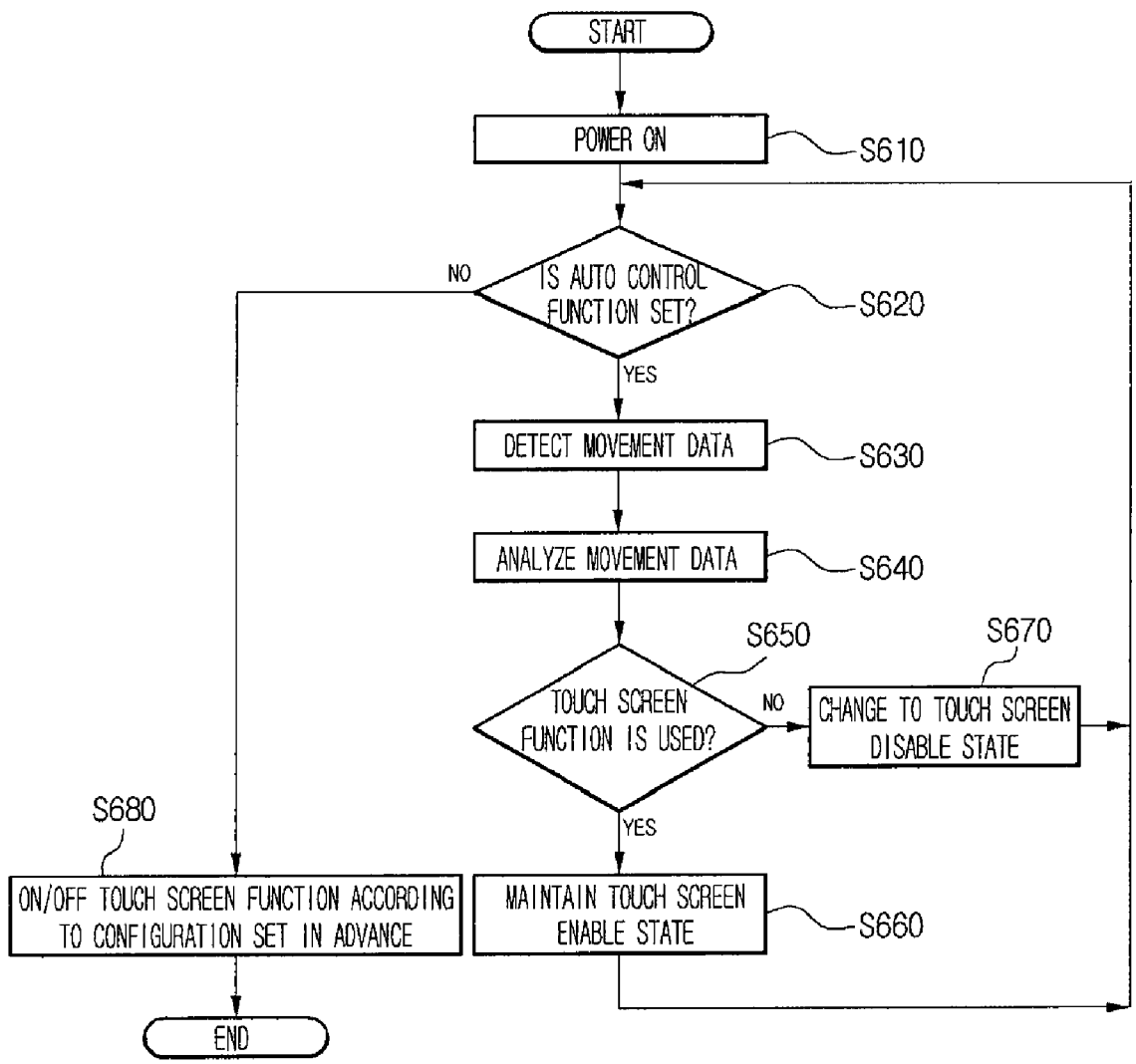
FIG. 6 is a flowchart of another method for controlling an operation of an information processing device using movement data.

FIG. 5 is a flowchart of a method for controlling an operation of an information processing device using movement data. FIG. 6 is a flowchart of another method for controlling an operation of an information processing device using movement data.

An example method for adjusting screen brightness in a notebook computer using movement data is described below with reference to FIGS. 2 and 5. When power of the notebook computer is turned on (S510), the control unit 120 judges whether a G-sensor is set to an enable state (S520).

If the G-sensor is set to the enable state as a result of the judgment (S520), the notebook computer is booted with the G-sensor enabled (S530), and brightness control of a display unit is performed using movement detection data output from the G-sensor.

A process of controlling brightness of the display unit using the movement detection data is described in detail. First, a G-sensor provided to the movement detecting unit 140 detects a signal corresponding to a movement degree of the notebook computer, converts the detected signal into a signal appropriate for being applied to the control unit 120, and outputs the converted signal to the control unit 120 (S540).

The control unit 120 receives the output signal from the movement detecting unit 140 to judge a level of the output signal (S550) and control brightness of the display unit 262 based on the level of the output signal (S560).

In one implementation, the control unit 120 divides the output signal range of the movement detecting unit 140 into four sections and assigns 'high', 'middle', 'low', and 'disable' to the four sections, as illustrated in Table 1 below. The control unit 120 can control brightness of the display unit 262 using a set brightness level corresponding to each section.

TABLE 1

|  | Free fall | Movement of Information processing device | Brightness level |
|---|---|---|---|
| High | 0.6 g | 1.2 g | Low level |
| Middle | 0.5 g | 1.4 g | Middle level |
| Low | 0.4 g | 1.6 g | High level |
| Disable |  |  | Normal level |

In Table 1, g is the gravitational acceleration.

The control unit 120 judges whether an output signal level from the G-sensor of the movement detecting unit 140 is a low level in order to control brightness of the display unit 262 (S551).

If the output signal level is the low level as a result of the judgment (S551), the control unit 120 applies a control signal to the brightness adjusting unit 263 to allow the display unit 262 to be displayed with brightness corresponding to the low level movement. As shown in Table 1, the high level brightness generally corresponds to the low level movement of the information processing device.

If the output signal level is not the low level as a result of the judgment (S551), the control unit 120 judges whether the output signal level is a middle level (S552).

If the output signal level is the middle level as a result of the judgment (S552), the control unit 120 applies a control signal to the brightness adjusting unit 263 to allow the display unit 262 to be displayed with brightness corresponding to the middle level movement.

If the output signal level is not the middle level as a result of the judgment (S552), the control unit 120 judges whether the output signal level is a high level (S553).

If the output signal level is the high level as a result of the judgment (S553), the control unit 120 applies a control signal to the brightness adjusting unit 263 to allow the display unit 262 to be displayed with brightness corresponding to the high level movement. As shown in Table 1, the low level brightness generally corresponds to the high level movement of the information processing device.

If the output signal level is not the high level as a result of the judgment (S553), the control unit 120 decides that the output signal level is beyond the three sections, and controls the display unit 262 to have a normal level brightness as if the G-sensor is disabled (S580).

In the case where the information processing device has been booted with the G-sensor disabled (S570) or an output of the G-sensor is beyond the set range, and the display unit 262 is controlled to normal level brightness (S580), whether a user inputs a G-sensor enable command using the user input unit 110 is checked for a predetermined period and a corresponding control is performed (S590).

In the above implementation, the control unit 120 directly adjusts an output of the brightness adjusting unit 263 in response to an output level of the movement detecting unit 140 in order to adjust brightness of the display unit 262. Alternatively, brightness adjustment can be achieved by changing operation configuration set values for adjusting brightness stored in the storing unit 151.

An implementation of a method for controlling a touch screen function in a notebook computer using movement data is described with reference to FIGS. 3 and 6. When power is turned on and the notebook computer starts to operate (S610), a control unit 120 judges whether a touch screen function is set to be automatically performed (S620).

If the touch screen function is not set to be automatically performed as a result of the judgment (S620), the touch screen function is allowed to be turned on/off according to an operation configuration set in advance (S680).

However, if the touch screen function is set to be automatically performed as a result of the judgment (S620), the control unit 120 receives movement data detected by a movement detecting unit 140 as the notebook computer or a peripheral device thereof moves (S630).

Then, the control unit 120 analyzes the movement data from the movement detecting unit 140 (S640) to judge whether the movement data corresponds to certain movement data that indicate that the touch screen function is being used (S650). Such movement data may be, for example, movement data regarding a user's behavior of detaching a pen from a pen holder or movement data regarding a user's behavior of inputting something on the screen.

If the movement detecting unit 140 judges the movement data to indicate that the touch screen function is being used (S650), the control unit 120 directly controls a touch screen driving unit 360 so that the touch screen function can be performed, or changes an operation configuration set value for performing the touch screen function that is stored in a storing unit 152 into an "enable" state to allow the touch screen function to be performed (S660).

On the other hand, if the movement data does not indicate that the touch screen function is being used (S650), the control unit 120 directly controls a touch screen driving unit 360 so that the touch screen function is disabled, or changes an operation configuration set value for performing the touch screen function that is stored in a storing unit 152 into a "disable" state (S670).

Through the above processes S660 and S670, the notebook computer can automatically turn on/off the touch screen function depending on a changed operation configuration in response to the movement data.

Figure 7:
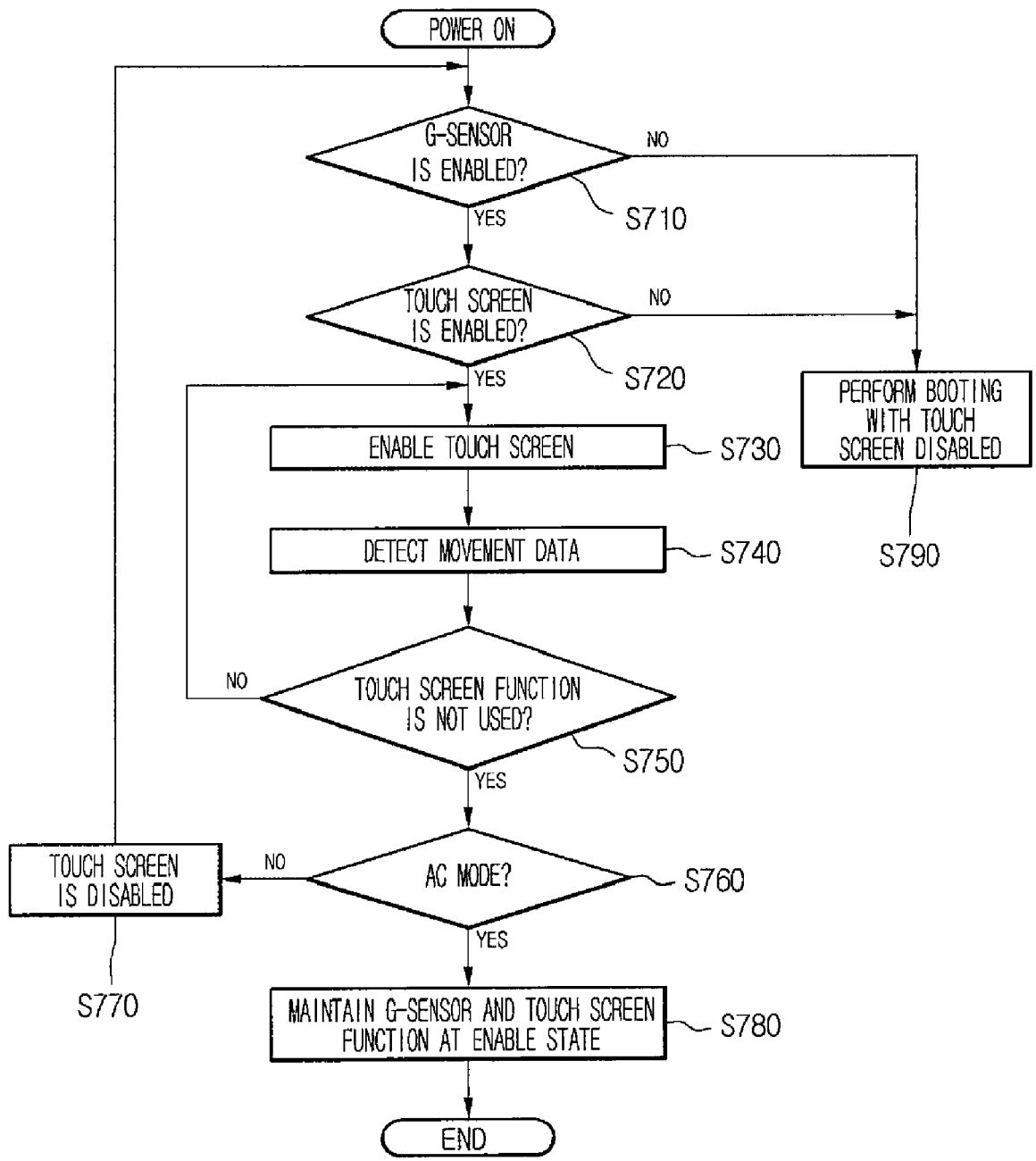
FIG. 7 is a flowchart of another method for controlling an operation of an information processing device using movement data.

Another example implementation of a method for controlling the operation of a notebook computer using a movement data is described below. FIG. 7 is a flowchart of a method for controlling an operation of an information processing device, such as, for example, a notebook computer.

Referring to FIG. 7, when power of a notebook computer is turned on, a control unit 120 judges whether a G-sensor is set to an "enable" state in order to judge whether an operation control function of the information processing device is set to be performed (S710).

If the G-sensor is not set to an "enable" state as a result of the judgment (S710), the notebook computer is booted with the touch screen function disabled (S790).

If the G-sensor is set to an "enable" state as a result of the judgment (S710), whether the touch screen function is in an enable state is judged (S720).

If the touch screen function is not in an enable state as a result of the judgment (S720), the notebook computer is booted with the touch screen function disabled (S790).

If the G-sensor is in an enable state and the touch screen function is also in an enable state, the touch screen function continues to be enabled (S730).

While the notebook computer is used with the touch screen function enabled, the movement detecting unit 140 detects movement data related to the touch screen function and outputs the detected movement data to the control unit 120 (S740).

The control unit 120 that has received the movement data analyzes the movement data to judge whether a user is currently using the touch screen function (S750).

If the user is determined to be currently using the touch screen function as a result of the judgment (S750), the touch screen function continues to be enabled (S730).

If the user is determined to be not currently using the touch screen function as a result of the judgment (S750), it is determined whether the power currently being used is an AC power (S760).

If the AC power is not being used, it is judged that an internal battery is used, and the touch screen function is changed from the enable state to a disable state so that the touch screen function is not performed (S770).

On the other hand, if the AC power is being used (S760), which means that the power saving is not critical for the notebook computer, the G-sensor and the touch screen function are maintained at the enable state so that the touch screen function is continuously performed (S780).

The described implementations reduce power consumed in an information processing device by changing an operation configuration value of the device using movement data of the device detected by a G-sensor, or by directly controlling a predetermined function. Also, the described implementations increase use convenience of the information processing device by disabling an operation of a function a user does not use for a predetermined time. Such implementations can also be applied to other cases where a predetermined operation is required for performing a function provided by an information processing device, and a characteristic of the predetermined operation can be detected.

Certain implementations may minimize power consumption of a battery by detecting movement data of an information processing device such as a notebook computer and automatically controlling screen brightness of a display unit of the information processing device on the basis of the detected movement data.

Certain implementations allow a user to conveniently use a predetermined function by judging whether the user uses the predetermined function of the information processing device on the basis of predetermined movement data of the information processing device or a peripheral device thereof to automatically control the predetermined function to one of enable and disable states.

Other implementations are within the scope of the following claims.

What is claimed is:

1. An information processing device comprising:
   a movement detecting unit configured to detect a movement of the information processing device and to provide a movement signal indicating the movement of the information processing device;
   a display unit configured to display information; and
   a control unit configured to
      control operation of the display unit based on the movement signal from the movement detecting unit, and
      control an amount of power consumption of the information processing device by determining that a brightness of the display unit is inversely proportional to a level of the movement of the information processing device.

2. The information processing device of claim 1, wherein the control unit is configured to control power consumption of the information processing device based on the movement signal.

3. The information processing device of claim 1, wherein brightness of the display unit is adjusted based on the movement signal.

4. The information processing device of claim 1, further comprising a touch screen unit which is configured to be disabled or enabled based on an orientation of the information processing device.

5. The information processing device of claim 1, further comprising a storage unit which is configured to be protected from an external impact based on the movement signal.

6. An apparatus for controlling an operation of an information processing device using movement data, the apparatus comprising:
   a set data storing unit for storing an operation configuration set value for performing a predetermined function of the information processing device;
   a function processing unit for performing the predetermined function using the operation configuration set value;
   a movement detecting unit for detecting movement data of the information processing device or a peripheral device thereof;
   a display unit; and
   a control unit configured to:
      control an operation of performing the predetermined function depending on an output of the movement detecting unit,
      control operation of the display unit based on the movement data, and
      using the movement data to control an amount of power consumption of the information processing device by determining that a brightness of the display unit is inversely proportional to a level of a movement of the information processing device.

7. The apparatus according to claim 6, wherein the information processing device is a notebook computer.

8. The apparatus according to claim 6, wherein the function processing unit is a screen brightness adjusting unit of the display unit or a touch screen driving unit.

9. The apparatus according to claim 8, wherein the screen brightness adjusting unit adjusts screen brightness of the display unit to a brightness level corresponding to an output of the movement detecting unit.

10. The apparatus according to claim 9, wherein the brightness level is a high level, a middle level, or a low level.

11. The apparatus according to claim 6, wherein the movement detecting unit outputs a signal that is in proportion to a movement degree or acceleration of the information processing device.

12. The apparatus according to claim 6, wherein the movement detecting unit comprises a G-sensor.

13. The apparatus according to claim 6, wherein the control unit comprises a movement data judging module for analyzing an output of the movement detecting unit to judge whether to modify the operation configuration set value for performing the predetermined function.

14. The apparatus according to claim 6, wherein the control unit directly controls the function processing unit or modifies set values of the set data storing unit depending on an output of a movement data judging module.

15. The apparatus according to claim 14, wherein the set value is to enable or disable the predetermined function based on an orientation of the information processing device.

16. A method for controlling an operation of an information processing device using movement data, the method comprising:
    detecting movement data of the information processing device corresponding to a movement of the information processing device;
    determining a screen brightness level of a display unit to correspond to the detected movement data; and
    controlling brightness of a display screen of the display unit to brightness corresponding to the determined screen brightness level; and
    using the movement data for controlling an amount of power consumption of the information processing device by determining that the brightness of the display screen of the display unit is inversely proportional to a level of the movement of the information processing device.

17. The method according to claim 16, wherein the detecting of the movement data is performed when an automatic control function according to the movement data is set.

18. The method according to claim 16, wherein the detecting of the movement data comprises detecting the movement data using a G-sensor.

19. The method according to claim 16, wherein the detecting of the movement data comprises detecting a signal that is proportional to a movement degree or acceleration of the information processing device.

20. The method according to claim 16, wherein the determining of the screen brightness level comprises determining the screen brightness as a high level, a middle level, or a low level depending on the movement data.

21. A method for controlling an operation of an information processing device using movement data, the method comprising:
    detecting movement data of the information processing device;
    determining whether to perform a touch screen function in response to the detected movement data;
    controlling performing of the touch screen function according to the determination; and
    using the movement data for controlling an amount of power consumption of the information processing device by determining that a brightness of a touch screen for a display unit is inversely proportional to a level of movement of the information processing device.

22. The method according to claim 21, wherein the detecting of the movement data is performed when an automatic control function according to the movement data is set.

23. The method according to claim 21, wherein the detecting of the movement data comprises detecting the movement data using a G-sensor.

24. The method according to claim 21, wherein the detecting of the movement data comprises detecting a signal that is proportional to a movement degree or acceleration of the information processing device.

25. The method according to claim 21, wherein the controlling of the performing of the touch screen function comprises changing operation configuration variable set values for performing the touch screen function to "enable" or "disable" based on an orientation of the information processing device.

26. The information processing device of claim 1, wherein the movement detecting unit is configured to detect an orientation of the information processing device.

27. The information processing device of claim 26, wherein the movement detecting unit is configured to detect an acceleration of the information processing device.

28. The information processing device of claim 27, further comprising:
    an audio output,
    wherein the information processing device is configured such that the control unit disables the audio output if the movement detecting unit detects an acceleration in a downwards direction.

29. The information processing device of claim 26, wherein the information processing device is configured to switch an orientation of the information displayed on the display unit in response to a detected orientation of the information processing device.

30. The information processing device of claim 29, wherein the information processing device is configured to present the orientation of the information displayed on the display unit to align with the orientation of the information processing device such that the information displayed on the display unit is presented in a horizontal position for reading when the orientation of the information processing device is aligned at least either horizontally or vertically with respect to a horizontal axis.

31. The information processing device of claim 1, wherein the control unit is further configured to control the amount of power consumption of the information processing device by determining the brightness of the display unit as a function of an amount of time the information processing device is in a certain position.

32. The information processing device of claim 1, wherein the control unit is further configured to control the brightness of the display unit as a function of an amount of time the information processing device is in a position.

33. The information processing device of claim 1, wherein the control unit is configured to:
    receive information regarding the position of the information processing device from the movement signal;
    determine an amount of time the information processing device is in a downward-facing position; and reduce an amount of brightness of the display unit upon determining that the information processing device is in the downward-facing position after a predetermined amount of time.

34. The information processing device of claim 1, wherein the control unit is configured to reduce a level of power consumed by the display unit upon receiving the movement signal that indicates an acceleration of the movement of the information processing device.

35. The information processing device of claim 1, wherein the control unit is configured to reduce a level of brightness provided by the display unit upon receiving the movement signal that indicates an acceleration of the movement of the information processing device.

36. An information processing device comprising:
   a movement detecting unit configured to detect a movement of the information processing device and to provide a movement signal indicating [the movement of the information processing device;
   a display unit; and
   a control unit configured to
      control operation of the display unit based on the movement signal from the movement detecting unit, and
      control an amount of power consumption of the information processing device by determining a likelihood that the display unit is being used by a user, wherein the likelihood that the display unit is being used by the user is inversely proportional to a level of the movement of the information processing device.

37. The information processing device of claim 36, further comprising a touch screen unit which is configured to be disabled or enabled based on the determined likelihood that the display unit is being used by the user.

38. The information processing device of claim 36, wherein when there is a determined high likelihood that the display unit is being used by the user then the power consumption of the display unit is a high power consumption level, when there is a low likelihood that the display unit is being used by the user then the power consumption of the display unit is a low power consumption level, and when there is a middle likelihood that the display unit is being used by the user then the power consumption is in a middle power consumption level between the high and low power consumption levels.

39. The information processing device of claim 36, wherein the control unit is configured to reduce a level of power consumed by the display unit as the level of the movement of the information processing device is increased.

40. The information processing device of claim 36, wherein the control unit is configured to reduce a level of brightness provided by the display unit as the level of the movement of the information processing device is increased.

41. The information processing device of claim 36, the detected movement of the information processing device comprises the detected movement of an entirety of the information processing device.

* * * * *